No. 741,243.

Patented October 13, 1903.

UNITED STATES PATENT OFFICE.

WILLIAM M. GROSVENOR, OF EDGEWATER HEIGHTS, NEW JERSEY, ASSIGNOR TO GENERAL CHEMICAL COMPANY, OF NEW YORK, N. Y., A CORPORATION OF NEW YORK.

PROCESS OF MAKING ACETATE OF SODA.

SPECIFICATION forming part of Letters Patent No. 741,243, dated October 13, 1903.

Application filed April 13, 1903. Serial No. 152,349. (No specimens.)

*To all whom it may concern:*

Be it known that I, WILLIAM M. GROSVENOR, a citizen of the United States, and a resident of Edgewater Heights, Bergen county, New Jersey, have invented certain new and useful Improvements in the Manufacture of Acetate of Soda, of which the following is a specification.

My invention relates to the manufacture of acetates, and has particular reference to the manufacture of acetate of soda from materials containing sulfate of soda and materials containing acetate of lime.

The object of my invention is to obtain from cheap and impure materials a high yield of acetate (and particularly acetate of soda) of great purity, good color, and crystalline form. To this end I proceed as follows in the manufacture of acetate of soda: I first mix a material containing sodium sulfate with other material containing calcium acetate, the latter wholly or largely in solution and preferably hot. The first-named material should contain sodium sulfate in the form of fused crystals or fused crystals partially dehydrated or anhydrous sodium sulfate fused or partly fused with as small an amount of water as possible. The mixture is to be made with such proportions of the original materials that there shall be an excess of calcium acetate. The mixture is then agitated and heated until its components have practically reached a condition of reaction equilibrium. Then while the mixture is still hot the liquid is separated from it. In case the presence of metallic impurities or of more complex organic acids in the liquid should render purification necessary this is obtained by the use of lime, followed by filtration or decanting. The result of mixing and heating the two components is the production of sodium acetate and calcium sulfate, and of course some of the calcium acetate remains undecomposed, since this material is used in excess. Omitting reference to the impurities, the reaction may be said to proceed approximately as follows:

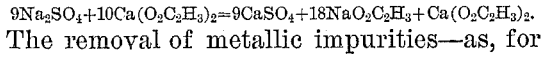

The removal of metallic impurities—as, for instance, acetate of copper—may be represented by the following equation:

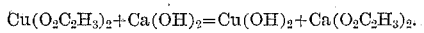

Other heavy metals behave similarly. Calcium salts containing certain higher organic acids are also precipitated. I then add sodium carbonate for the purpose of decomposing the remainder of calcium acetate as expressed by the equation

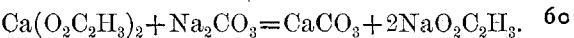

Any excess of lime used is removed at the same time. The solids formed are separated in any suitable manner, as by filtration. The liquor obtained from the preceding operation or operations is evaporated and there results a mass of acetate of soda which is dehydrated and completely fused by prolonged heating in an oven or muffle with or without stirring. Any form of apparatus by which the heat can be equably maintained and distributed to the molten mass is applicable. This heating and melting or fusing causes the organic impurities to be polymerized and finally carbonized. The reactions vary considerably and are of a complicated nature, and I therefore have refrained from attempting to express them by equations, but will only state the result—namely, the production of acetate of soda of considerable purity. The fused mass is then dissolved, either while hot or after cooling. I thus obtain a solution of acetate of soda from which I obtain crystals after acidification with acetic acid, if desired. A number of crops can be obtained from the same solution. The remaining mother-liquors may be returned to the original mixture or liquid either before or after the removal of metallic impurities and more complex organic acids. All mother-liquors when contaminated with mineral acids other than sulfuric acid may finally be utilized by prolonged heating, so as to first evaporate the liquid and then dehydrate and fuse the remaining solid, whereupon the impure acetate of sodium so obtained can be decomposed by the addition of sulfuric acid or an acid salt thereof—as, for instance, niter cake. The volatile acids can then be distilled and afterward separated, while the remaining sodium sulfate after sufficient roasting can be returned to the cycle of the process at the first stage. The action of heat on a mixture of sulfuric acid and sodium acetate is represented by the equation

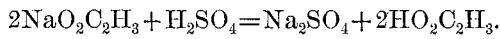
$$2NaO_2C_2H_3 + H_2SO_4 = Na_2SO_4 + 2HO_2C_2H_3.$$

In case niter cake is present the reaction may be said to occur approximately as follows:

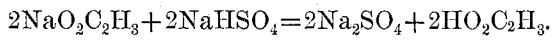
$$2NaO_2C_2H_3 + 2NaHSO_4 = 2Na_2SO_4 + 2HO_2C_2H_3.$$

Most volatile acids will be similarly affected when heat is applied.

It will be obvious that some of the steps described above and which have for their purpose to secure as high a yield of acetate of soda as possible may be omitted when a lower yield is satisfactory. In any event, however, the process as hereinbefore described enables me to produce commercially-pure acetate of soda from cheap and impure materials. This result is due, as I believe, chiefly to three facts: First, I employ an excess of calcium acetate; second, I complete the decomposition of the acetate of lime by a reagent (carbonate of soda) which, though high-priced, is used in relatively small quantity and which is itself a purifying agent under the conditions used, and, third, I employ just sufficient heat to produce and maintain complete fusion of the mass containing acetate of soda.

As a practical example of my process, I will now describe the manufacture of acetate of soda from gray lime and salt cake, (impure $Na_2SO_4$.) The salt cake should contain as little sodium chlorid as possible in order to delay the time when the accumulation of this salt in the mother-liquors will contaminate them to such an extent as to compel the application of the final purifying operation above referred to. The salt cake should preferably be ground, so that it may dissolve readily. Fifty pounds of this salt cake is added to every five to seven gallons of water in a suitably-heated pan of iron or copper. The minimum amount of water required is found to vary somewhat with the character of the ground salt cake. While the solution is boiling vigorously a previously-prepared hot saturated solution of calcium acetate is added with constant stirring and boiling. This solution is made by the extraction of gray lime with cold water, it having been shown that acetate of lime is more soluble in cold water than in hot water, and the reverse is generally true of its impurities. Therefore on heating the solution is apt to become supersaturated and to contain suspended acetate of calcium. When the gray lime solution is all added, there should be from five per cent. to ten per cent. excess of calcium acetate in the mixture. Boiling is continued for a short time, and then both liquid and solid matter are rapidly transferred to the decanting-pot. After standing the hot liquor may be quite completely decanted from the heavy dense precipitate. Whatever liquor remains may be removed by centrifugal action and moderate washing or by agitation with the water to be used in preparing the lime solution or the fused Glauber salt from the salt cake. The decanted liquor is treated with sodium carbonate and boiled, the addition of carbonate being continued until a sample of the boiling liquor no longer gives a precipitate with sodium-carbonate solution. After standing the precipitated calcium carbonate is likewise readily left behind on decantation and being much smaller in quantity is allowed to accumulate before complete liquor separation, as indicated for the sulfate. The decanted solution now contains acetate of soda contaminated chiefly by organic matter and is rapidly evaporated and dehydrated in open shallow pans. When it begins to solidify, stirring is begun and kept up constantly until complete solidification occurs. The practically anhydrous salt is now placed in a muffle-furnace and heated, at first entirely from above and then equally on top and bottom, until complete fusion is obtained. After fusion severe agitation is avoided, as any material splashed on the sides is likely to be less thoroughly treated. When the fusion is complete, the temperature is maintained as nearly constant as possible for five to ten hours, according to the quality of gray lime used. The "melt" is then run out either directly into water or on cooling-slabs, where it sets and is broken up for solution. If the previous operations have been properly conducted, this solution at $23\frac{1}{2}°$ Baumé (boiling) yields sixty per cent. of its contents as excellent commercial salt, and on evaporation to 22° Baumé (boiling) the mother-liquors yield about twenty per cent. more of the same. Frequently a third or even fourth crop may be obtained before it is necessary to return the liquors to the carbonation-tank or the conversion-boiler.

I have hereinbefore described the manufacture of acetate of soda according to my invention, this being the acetate which is most extensively used in practice. The invention is, however, applicable to the manufacture of the acetates of other metals having soluble sulfates. Moreover, I desire it to be understood that instead of acetate of calcium I may employ any other soluble acetate of a metal the sulfate of which is only slightly soluble and the carbonate of which is practically insoluble. Thus, in a more generic way, I carry out my invention by mixing and heating a material containing the soluble sulfate of the metal whose acetate is desired with another material containing a soluble acetate of a metal the sulfate of which is only slightly soluble and the carbonate of which is practically insoluble. This soluble acetate should be used in excess. After separating the precipitate from the liquid I add to the latter the carbonate of the metal whose acetate it is desired to produce. Then follows evaporation, dehydration, torrification, solution, and crystallization, as hereinbefore described in detail with reference to the manufacture of acetate of soda.

The temperature required to produce and maintain complete fusion of the mass containing the desired acetate varies according to the composition of the mixture; but the particular fusion temperature in each individual case should not be exceeded materially.

I claim as my invention and desire to secure by Letters Patent—

1. The herein-described improvement in the manufacture of acetate of soda, which consists in mixing and heating a material containing sodium sulfate with another material containing calcium acetate, separating the liquid from the mixture, evaporating the liquid, and fusing the remaining solid mass.

2. The herein-described improvement in the manufacture of acetate of soda, which consists in mixing and heating a material containing sodium sulfate with another material containing calcium acetate, separating the liquid from the mixture, evaporating the liquid, fusing the remaining solid mass, dissolving it and crystallizing the acetate of soda from the solution.

3. The herein-described improvement in the manufacture of acetate of soda, which consists in mixing and heating a material containing sodium sulfate with another material containing calcium acetate, the latter being in excess, separating the liquid, then adding sodium carbonate thereto to decompose the remainder of calcium acetate, again separating the liquid from the solid and extracting the sodium acetate from said liquid.

4. The herein-described improvement in the manufacture of acetate of soda, which consists in mixing and heating a material containing sodium sulfate with another material containing calcium acetate, the latter being in excess, separating the liquid, then adding sodium carbonate thereto, again separating the liquid from the solids, evaporating the liquid and fusing the remaining solid mass, dissolving said mass and causing the solution to crystallize.

5. The herein-described improvement in the manufacture of acetate of soda from mother-liquors containing the same and contaminated with mineral acid, which consists in heating the said mother-liquors to evaporate the liquid and fuse the remaining solid, and then adding sulfuric acid and further heating to expel the mineral acids and enable the sodium to be returned to the process.

6. The herein-described improvement in the manufacture of acetate of soda, which consists in mixing and heating a material containing sodium sulfate with another material containing calcium acetate, the latter being in excess, separating the liquid, then adding sodium carbonate thereto, again separating the liquid from the solids, heating the liquid to evaporate it and to fuse the remaining solid, dissolving said solid and crystallizing the resultant sodium acetate from successive portions of the solution, heating the contaminated mother-lyes to evaporate them, and then fuse the remaining solid, and finally adding sulfuric acid in the presence of heat to purify the sodium acetate.

7. The herein-described improvement in the manufacture of acetates, which consists in mixing and heating a material containing the soluble sulfate of the metal whose acetate is desired, with another material containing a soluble acetate of a metal the sulfate of which is only slightly soluble and the carbonate of which is practically insoluble, said soluble acetate being in excess, evaporating the resulting liquid, and heating the remaining solid mass to a temperature just sufficient to produce and maintain its torrification.

8. The herein-described improvement in the manufacture of acetates, which consists in mixing and heating a material containing the soluble sulfate of the metal whose acetate is desired, with another material containing a soluble acetate of a metal the sulfate of which is only slightly soluble and the carbonate of which is practically soluble, said soluble acetate being in excess, separating the liquid, adding thereto the carbonate of the metal whose acetate is desired, again separating the liquid, evaporating it, and heating the remaining solid mass to a temperature just sufficient to produce and maintain its torrification.

In testimony whereof I have signed my name to this specification in the presence of two subscribing witnesses.

WILLIAM M. GROSVENOR.

Witnesses:
JOHN LOTKA,
EUGENE EBLE.